(12) United States Patent
Colnot

(10) Patent No.: US 9,792,439 B2
(45) Date of Patent: Oct. 17, 2017

(54) METHOD AND SYSTEM FOR SECURELY UPDATING FIRMWARE IN A COMPUTING DEVICE

(71) Applicant: NXP B.V., Eindhoven (NL)

(72) Inventor: Vincent Cedric Colnot, Uccle (BE)

(73) Assignee: NXP B.V., Eindhoven (NL)

( * ) Notice: Subject to any disclaimer, the term of this patent is extended or adjusted under 35 U.S.C. 154(b) by 888 days.

(21) Appl. No.: 13/622,534

(22) Filed: Sep. 19, 2012

(65) Prior Publication Data
US 2014/0082373 A1    Mar. 20, 2014

(51) Int. Cl.
G06F 11/30    (2006.01)
G06F 21/57    (2013.01)

(52) U.S. Cl.
CPC .......... *G06F 21/572* (2013.01); *G06F 21/575* (2013.01)

(58) Field of Classification Search
CPC ............. G06F 21/22; G06F 21/24; G06F 9/44
USPC ................ 713/193, 168–174, 182–186, 202; 709/206, 225, 229, 249, 389; 726/2–8
See application file for complete search history.

(56) References Cited

U.S. PATENT DOCUMENTS

| | | |
|---|---|---|
| 5,844,986 A | 12/1998 | Davis |
| 6,069,647 A | 5/2000 | Sullivan et al. |
| 6,175,925 B1 | 1/2001 | Nardone et al. |
| 6,178,509 B1 | 1/2001 | Nardone et al. |
| 6,205,550 B1 | 3/2001 | Nardone et al. |
| 6,970,565 B1 | 11/2005 | Rindsberg |
| 2003/0196102 A1 | 10/2003 | McCarroll |
| 2008/0072068 A1* | 3/2008 | Wang .................... G06F 21/572 713/191 |
| 2008/0165971 A1 | 7/2008 | de Cesare et al. |

(Continued)

FOREIGN PATENT DOCUMENTS

| | | |
|---|---|---|
| CN | 1917424 A | 2/2007 |
| EP | 1914749 A1 | 4/2008 |

(Continued)

OTHER PUBLICATIONS

Halbronn C., Sigwald J.; "iPhone Security model & Vulnerabilities"; Sogeti/ESEC; HITB SecConf 2010; p. 1-33.

(Continued)

*Primary Examiner* — Evans Desrosiers

(57) ABSTRACT

Embodiments of a method are disclosed. One embodiment is a method for securely updating firmware in a computing device, in which the computing device includes a host processor and a non-volatile memory. The method involves receiving a double-encrypted firmware image from an external firmware source, wherein the double-encrypted firmware image is generated from firmware that is encrypted a first time using a first crypto-key and then encrypted a second time using a second crypto-key. The method also involves receiving the second crypto-key from an external key source, decrypting the double-encrypted firmware image using the second crypto-key to produce an encrypted firmware image, storing the encrypted firmware image in the non-volatile memory of the computing device, reading the encrypted firmware image from the non-volatile memory of the computing device, decrypting the encrypted firmware image using the first crypto-key, and executing the firmware on the computing device.

17 Claims, 14 Drawing Sheets

(56) References Cited

U.S. PATENT DOCUMENTS

| | | | |
|---|---|---|---|
| 2009/0257595 A1* | 10/2009 | de Cesare et al. | 380/277 |
| 2010/0008510 A1 | 1/2010 | Zayas | |
| 2011/0239211 A1* | 9/2011 | Kim et al. | 717/178 |
| 2011/0261957 A1* | 10/2011 | Catrein | H04N 21/23432 380/42 |
| 2012/0166781 A1 | 6/2012 | de Cesare et al. | |
| 2012/0198224 A1* | 8/2012 | Leclercq | H04L 9/083 713/2 |

FOREIGN PATENT DOCUMENTS

| | | | |
|---|---|---|---|
| EP | 2131524 | A2 | 12/2009 |
| WO | 2007033321 | A2 | 3/2007 |
| WO | 2009152557 | A1 | 12/2009 |

OTHER PUBLICATIONS

Apple Inc.; "iOS Security"; May 2012; p. 1-20.
Belenko A., Sklyarov D.; "Evolution of iOS Data Protection and iPhone Forensics: from iPhone OS to iOS5"; Co. Ltd.; Black Hat abu dhabi; 2011; p. 1-50 Elcomsoft.
Aucsmith, D.; "Tamper Resistant Software: An Implementation"; p. 1-6.
Bedrune, Jean-Baptiste; iPhone data protection in depth; Sogeti/ESEC; p. 1-59.
European Search Report, 13183788.2, Dec. 20, 2013.

* cited by examiner

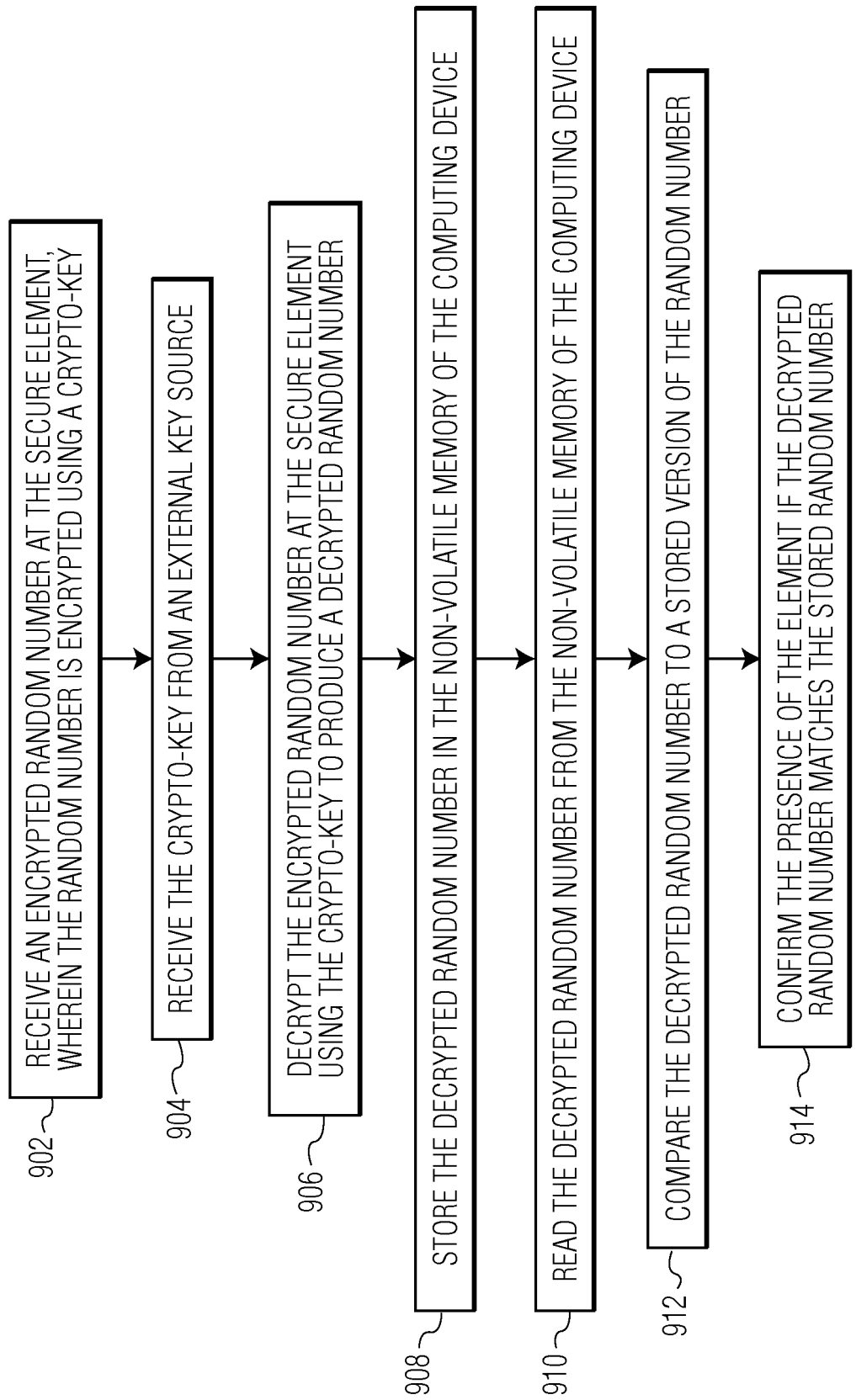

METHOD AND SYSTEM FOR SECURELY UPDATING FIRMWARE IN A COMPUTING DEVICE

Computing devices, such as smartphones, tablet computers, portable music players, and set top boxes, utilize operating systems that impose limitations on the type of software applications that can be run on the computing devices. "Jailbreaking" is a process of removing certain limitations imposed by the operating system of a computing device. Jailbreaking such a computing device often involves gaining access to and modifying the computing device's firmware and can be characterized as an untethered jailbreak in which the device is jailbroken upon each re-boot or a tethered jailbreak in which the jailbreak is lost once the device is powered down. Techniques to prevent jailbreaking include secure boot operations, signature verification, hash check at run time, address scrambling, and software obfuscation. While it is important to provide only secure access to the firmware, there is also a need to legitimately update a device's firmware with an authorized version of the firmware. Although techniques to prevent jailbreaking and techniques to update firmware do exist, such techniques are always being tested by malicious actors.

Embodiments of a method are disclosed. One embodiment is a method for updating firmware in a computing device, in which the computing device includes a host processor and a non-volatile memory. The method involves receiving a double-encrypted firmware image from an external firmware source, wherein the double-encrypted firmware image is generated from firmware that is encrypted a first time using a first crypto-key and then encrypted a second time using a second crypto-key. The method also involves receiving the second crypto-key from an external key source, decrypting the double-encrypted firmware image using the second crypto-key to produce an encrypted firmware image, storing the encrypted firmware image in the non-volatile memory of the computing device, reading the encrypted firmware image from the non-volatile memory of the computing device, decrypting the encrypted firmware image using the first crypto-key to produce the firmware, and executing the firmware on the computing device.

A computing device is also disclosed. In one embodiment, the computing device includes a data interface, a host processor, a non-volatile memory, and a secure element. The data interface is configured to receive a double-encrypted firmware image from an external firmware source, wherein the double-encrypted firmware image is generated from firmware that is encrypted a first time using a first crypto-key and then encrypted a second time using a second crypto-key, and to receive the second crypto-key from an external key source. The host processor is configured to execute program code of the firmware. The non-volatile memory is configured to store an encrypted image of the firmware. The secure element is located in a data path between the host processor and the non-volatile memory and has a crypto-engine. The secure element is configured to decrypt the double-encrypted firmware image using the second crypto-key to produce an encrypted firmware image and the secure element is configured to provide the encrypted firmware image to the non-volatile memory of the computing device for storage. The host processor is configured to read the encrypted firmware image from the non-volatile memory, to decrypt the encrypted firmware image using the first crypto-key to produce the firmware, and to execute program code of the firmware on the computing device.

A secure element for use in a computing device that includes a host processor and a non-volatile memory is also disclosed. In one embodiment, the secure element includes a host-side bus interface, a memory-side bus interface, and a crypto-engine. In the embodiment, a double-encrypted firmware image is received at one of the interfaces, the double-encrypted firmware image being generated from firmware that is encrypted a first time using a first crypto-key and then encrypted a second time using a second crypto-key. The crypto-engine is configured to decrypt the double-encrypted firmware image using the second crypto-key to produce an encrypted firmware image and the memory-side bus interface is configured to provide the encrypted firmware image to the non-volatile memory for execution by the host processor.

Embodiments of a method are disclosed. One embodiment is a method for confirming the presence of a secure element in a computing device, in which the computing device includes a host processor and a non-volatile memory. The method involves receiving an encrypted random number at the secure element, wherein the random number is encrypted using a crypto-key. The method also involves receiving the crypto-key from an external key source, decrypting the encrypted random number at the secure element using the crypto-key to produce a decrypted random number, storing the decrypted random number in the non-volatile memory of the computing device, reading the decrypted random number from the non-volatile memory of the computing device, comparing the decrypted random number to a stored version of the random number, and confirming the presence of the element if the decrypted random number matches the stored random number.

Other aspects in accordance with an embodiment of the invention will become apparent from the following detailed description, taken in conjunction with the accompanying drawings, illustrated by way of example of the principles of the invention.

FIG. 9 is a process flow diagram of a process for confirming the presence of a secure element in a computing device in accordance with the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1A:
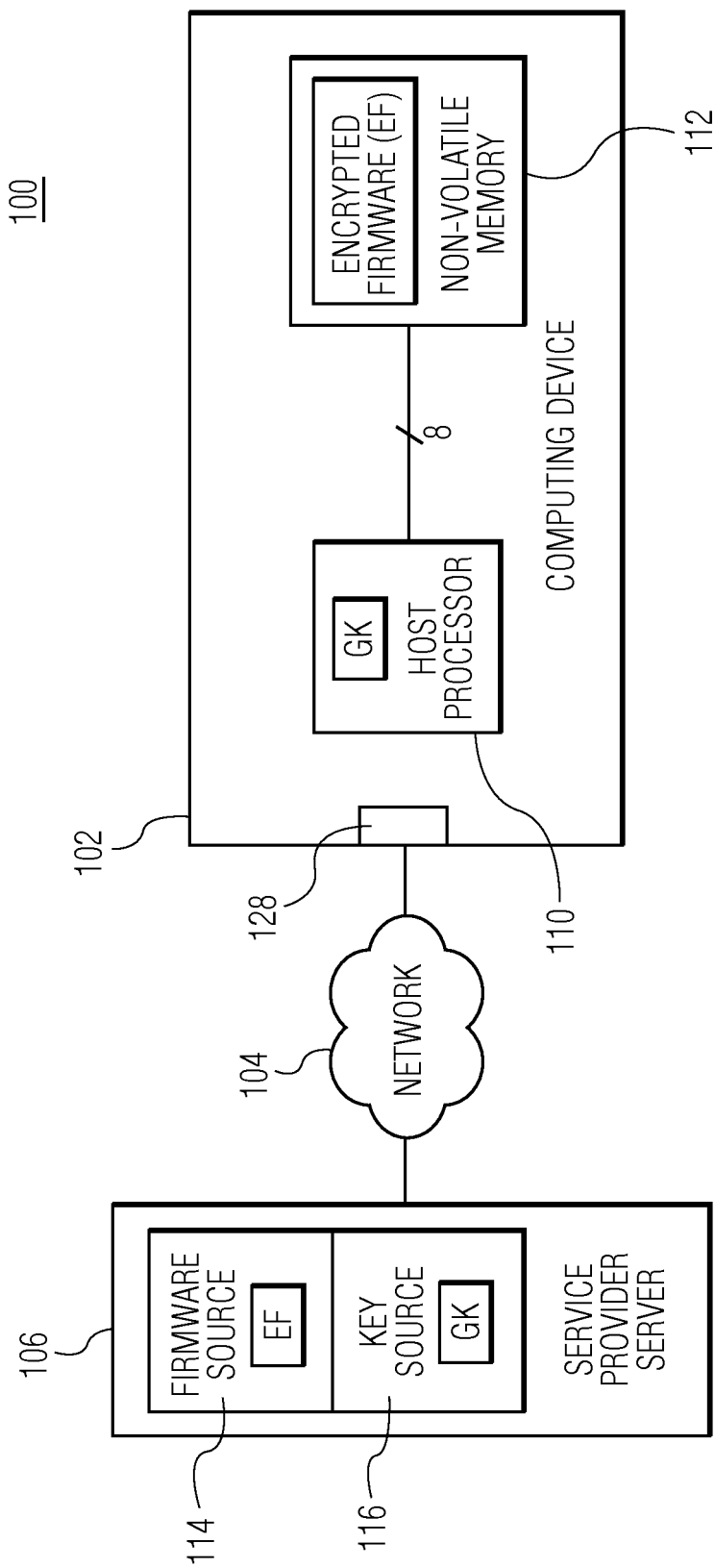
FIG. 1A depicts a network architecture that includes a computing device, a communications network, and a service provider server.

FIG. 1A depicts a network architecture 100 that includes a computing device 102, a communications network 104, and a service provider server 106. The network architecture is used to update the firmware of the computing device as is known in the prior art. The computing device, such as a smartphone or tablet computer, includes a host processor 110, non-volatile memory 112, such as flash memory, and a network interface 128. The service provider server includes a firmware source 114 that stores an encrypted image of the firmware (encrypted firmware, EF) and a key source 116 that stores an encryption key, e.g., a group key (GK). The communications network, such as the Internet, supports data communications between the computing device and the service provider server.

Figure 1B:
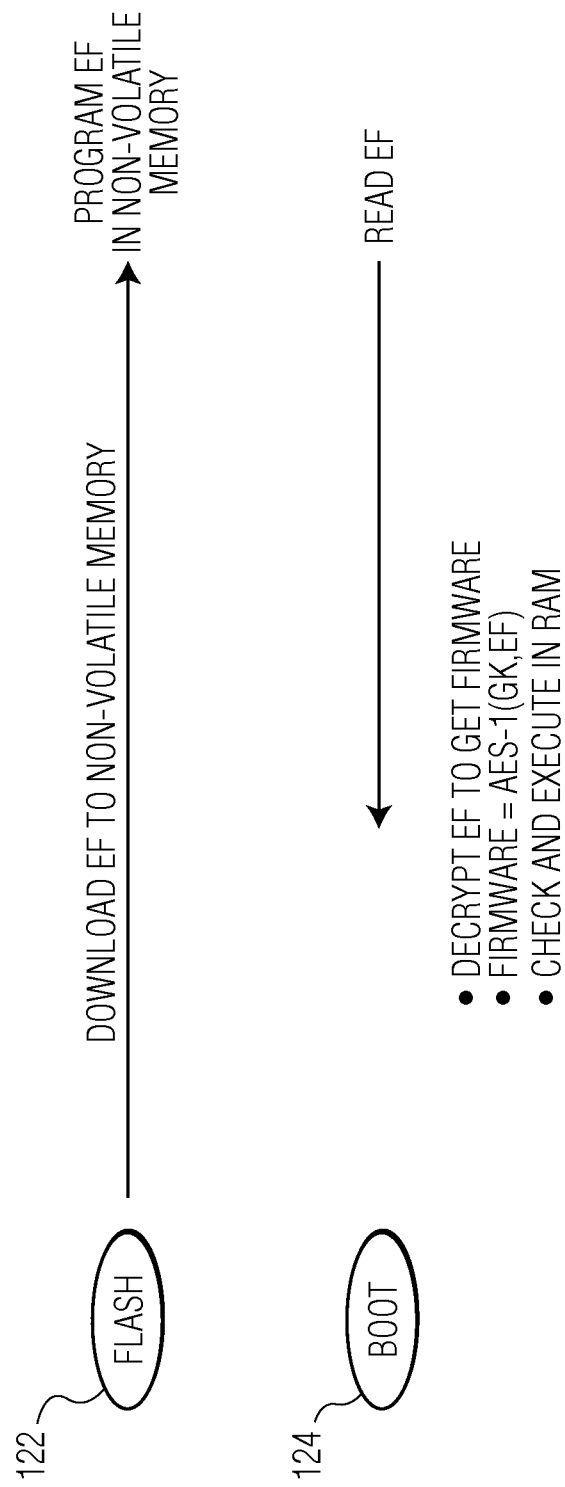
FIG. 1B illustrates a conventional process for updating the firmware of the computing device of FIG. 1A with firmware that is stored at the service provider server.

FIG. 1B illustrates a conventional process for updating the firmware of the computing device 102 of FIG. 1A with firmware that is stored at the service provider server 106. In a "Flash" operation 122, the encrypted firmware, EF, is downloaded from the service provider server to the computing device and stored in the device's non-volatile memory 112. In a "Boot" operation 124, the encrypted firmware, EF, is read by the host processor from the non-volatile memory and is then decrypted by the host processor using the decryption key, GK. Once decrypted, the firmware is checked and executed in RAM of the host processor. The encrypted firmware, EF, is read from the non-volatile memory upon each subsequent re-boot. Although this technique for upgrading the computing device's firmware works well, the technique is susceptible to untethered jailbreaking by using the host processor and the stored group key to generate a jailbreak image and then storing the jailbreak image in the non-volatile memory of the computing device, also referred to as "re-flashing", for use at re-boot.

In an embodiment in accordance with the invention, a secure element is placed in a data path between a host processor and a non-volatile memory of a computing device to enable implementation of a double encryption scheme in which the firmware is encrypted as normal with a first crypto-key and then encrypted a second time with a second crypto-key, which is, for example, supplied by the service provider server and known in the computing device only by the secure element. Double encrypting the firmware prevents the computing device from using a stored jailbreak image to re-boot the computing device, thereby providing a significant impediment to untethered jailbreaking. As used herein, firmware is a combination of non-volatile memory (also referred to as persistent memory) and program code and data stored in the non-volatile memory. The term firmware may also be used herein to refer more specifically to the program code and data that is stored in the non-volatile memory. In an embodiment, the program code and data of the firmware is program code and data related to a control program of the computing device, such as the device's boot program code. In other embodiments, the firmware may also include the device's operating system (OS), sometimes referred to as the "kernel", and higher level applications that require the operating system to function. In an embodiment, some operating system applications such as a browser and/or media player are integrated into the kernel or are stored as separate firmware objects. The firmware objects can be updated independently of each other or together. In an embodiment, a firmware "image" refers to a single file containing the complete contents of a software object. In an embodiment, a firmware image is created by creating a complete sector-by-sector copy of a source medium, thereby perfectly replicating the structure and contents of the stored firmware.

Figure 2A:
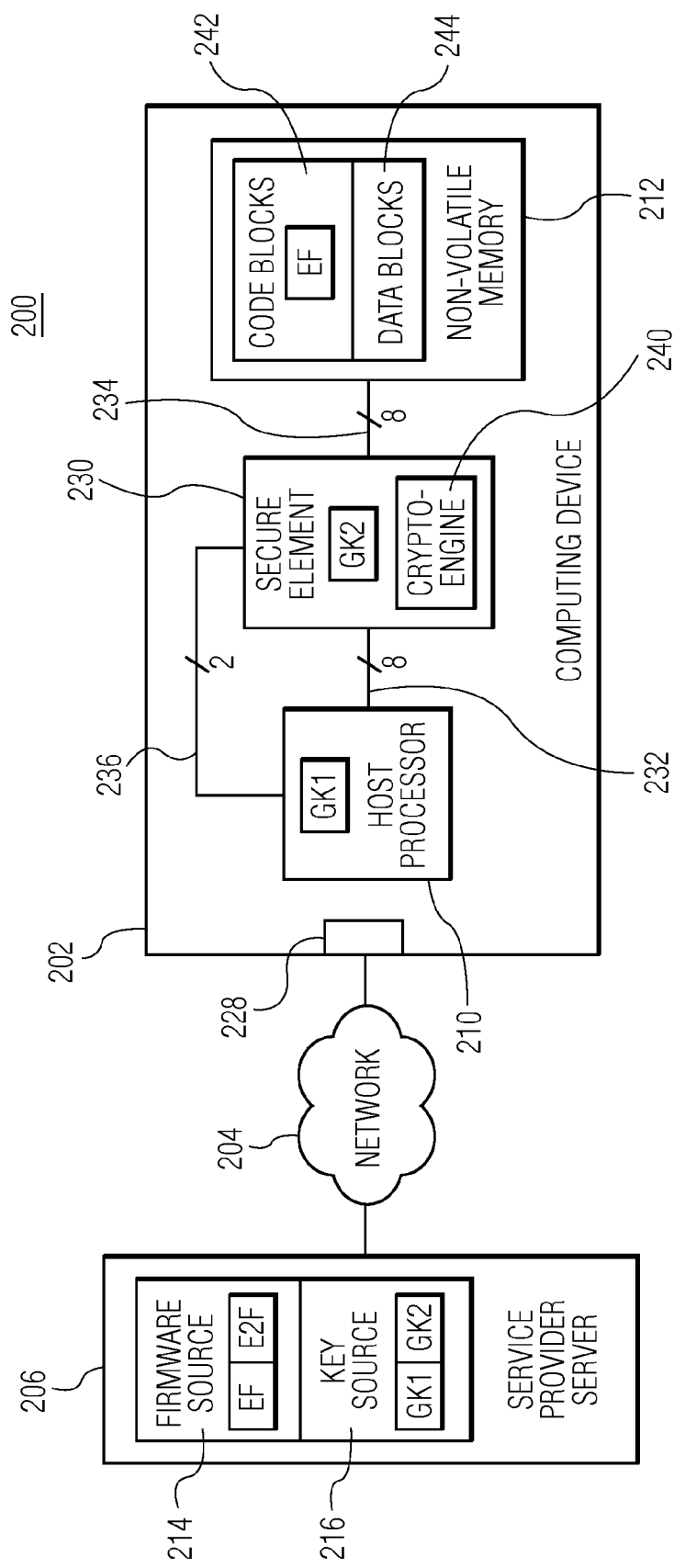
FIG. 2A depicts a network architecture for updating firmware in a computing device in accordance with the invention.

FIG. 2A depicts a network architecture 200 for updating firmware in a computing device in accordance with the invention. The network architecture of FIG. 2A includes a computing device 202, a communications network 204, and a service provider server 206. The computing device includes a host processor 210, non-volatile memory 212, a network interface 228, and a secure element 230 that is located in a data path between the host processor 210 and the non-volatile memory 212. The data path may include bus segments, e.g., an 8-bit serial bus segment 232 that connects the host processor to the secure element and an 8-bit serial bus segment 234 that connects the secure element to the non-volatile memory. The computing device also includes a control bus 236 that is used to communicate command and control information between the host processor and the secure element. For example, the control bus is a serial 2-bit Inter-Integrated Circuit ($I^2C$) bus.

In an embodiment, the computing device 202 is a device such as a smartphone, a tablet computer, a personal computer, or a set-top box, although the computing device can be another type of device that includes a host processor and non-volatile memory. The host processor 210 is a processor such as a central processing unit (CPU) that provides microinstruction and data processing capability for the computing device. The host processor may include a multifunction processor and/or an application-specific processor. Examples of the host processor include the PowerPC™ family of processors by IBM, the x86 family of processors by Intel, and the Ax family of processors from Apple.

The non-volatile memory 212 may be, for example, flash memory, e.g., NAND flash or NOR flash, EEPROM, some other mass storage component, e.g., a hard disk, or a combination thereof. In the embodiment of FIG. 2A, the non-volatile memory is NAND flash, e.g., 8 GB, 16 GB, 32 GB, or 64 GB. The network interface 228 of the computing device 202 enables the device to connect to and communicate with the service provider server 206 via the communications network 206. For example, the network interface may support USB, Ethernet, and/or wireless communications or other communications protocols as are known in the field.

The secure element 230 includes a crypto-engine 240 that is able to implement a cryptographic algorithm, such as an Advanced Encryption Standard (AES) algorithm. The secure element is also configured to receive and temporarily store a crypto-key that is used to decrypt a double encrypted version of the firmware. In an embodiment, the crypto-engine of the secure element is configured to generate a random crypto-key at power up and will use the random crypto-key for decryption until another crypto-key, e.g., the second crypto-key, GK2, is received. In an embodiment, the secure element is "secure" in the sense that the secure element is a highly tamper resistant device that provides a secure execution environment isolated from the host processor. In an embodiment, the secure element is tamper resistant in that the element can resist software and hardware attacks, either remotely or locally, e.g., the secure element is resistant against side channel analysis.

Figure 3:
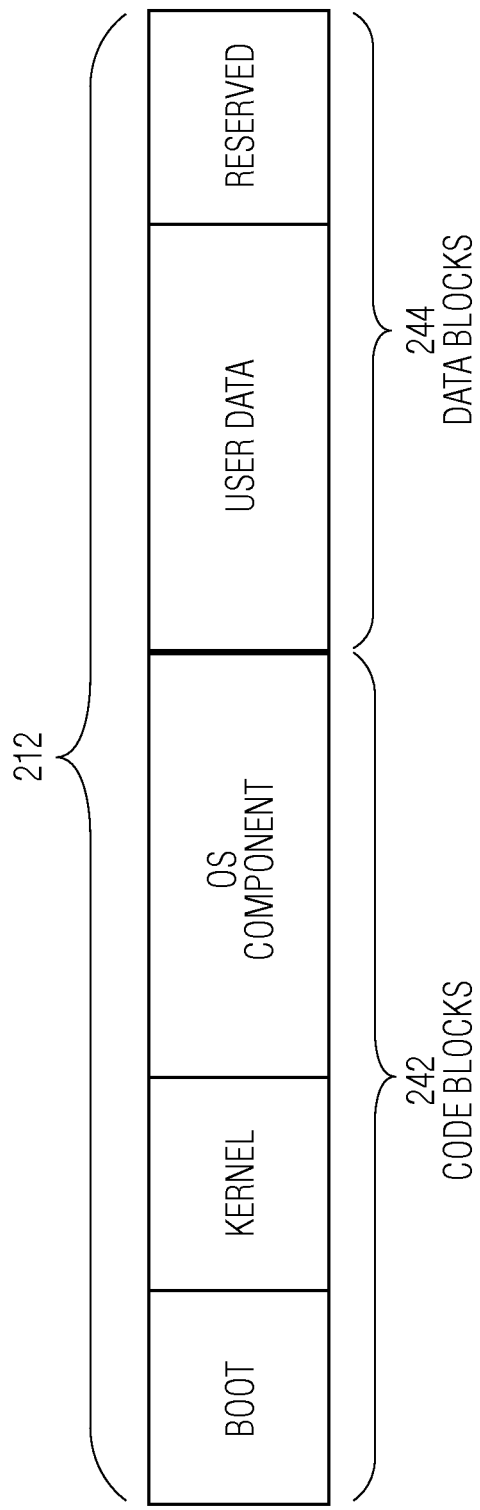
FIG. 3 illustrates a non-volatile memory that has been divided into separate memory blocks.

In order to understand the function of the secure element, it is helpful to understand how data is stored in the non-volatile memory 212 of the computing device 202. FIG. 3 illustrates an embodiment of the non-volatile memory 212 of FIG. 2A, which has been divided into separate memory blocks, which blocks are designated as either "code blocks" or "data blocks". Code blocks 242 include blocks designated to store, for example, the device's firmware, e.g., stored as firmware objects. In an embodiment, the firmware includes program code and data used to boot and operate the computing device. In the embodiment of FIG. 3, the code blocks include, for example, a "Boot" object, a "Kernel" object, and an "OS Components" object. In the embodiment of FIG. 3, the "OS Components" object is, for example, a root file system for storing higher level software such as OS libraries, a graphical user interface (GUI), and/or native applications such as a browser, media player(s), and messaging. Data blocks 244 store user data and may also include reserved blocks, which are reserved for other specified data. In the embodiment of FIG. 3, the "User Data" object is, for example, a data file system for storing the user data such as user applications, music, and/or movies. In an embodiment, the service provider specifies the layout map of the non-volatile memory during firmware installation or as part of a subsequent firmware update.

As is known in conventional computing devices, the data stored in the code blocks 242 is encrypted using a crypto (encryption and/or decryption) key, referred to herein as a group key (GK), and the data stored in the data blocks 244 is encrypted using a crypto-key, referred to herein as a device unique key, UK. In an embodiment, the GK key is a crypto-key that is common to all processors in a class of devices. For example, all computing devices using the same host processor have the same group key, GK, sometimes referred to as the group ID key, GID. In another embodiment, the group key, GK, is common to a particular version of firmware or a particular firmware update. In an embodiment, the unique key, UK, is a crypto-key that is unique to each host processor. For example, all computing devices have a different unique key, UK, sometimes referred to as the unique ID key, UID. In an embodiment, the GK and UK keys are AES 256-bit permanent keys that are fused/burned into the silicon of the host processor during manufacture. In an embodiment, the group key, GK, is recorded by the device manufacturer and/or service provider while the UK key is programmed into the host processor but not recorded by the device manufacturer and/or service provider.

Referring back to FIG. 2A, the service provider server 206 includes a firmware source 214 and a key source 216. The key source stores two different group keys, GK1 and GK2, and the firmware source stores an encrypted firmware image, EF, which is encrypted with the first crypto-key, GK1, and a double-encrypted firmware image, E2F, which is the encrypted firmware image, EF, encrypted a second time using the second crypto-key, GK2. In an embodiment, the firmware is encrypted using the Advanced Encryption Standard (AES). The two versions of the encrypted firmware can be expressed as:

$$EF=AES(GK1, firmware) \quad (1)$$

$$E2F=AES(GK2, EF) \quad (2)$$

With reference to the host processor 210 of FIG. 2A, the first crypto-key, GK1, is a permanent crypto-key that is fused/burned into the host processor at the time of manufacture. As is described in more detail below, the second crypto-key, GK2, is not a permanent key like GK1, rather, it is a key that is downloaded from the service provider server 206 and temporarily stored in writable memory of the secure element 230.

Figure 2B:
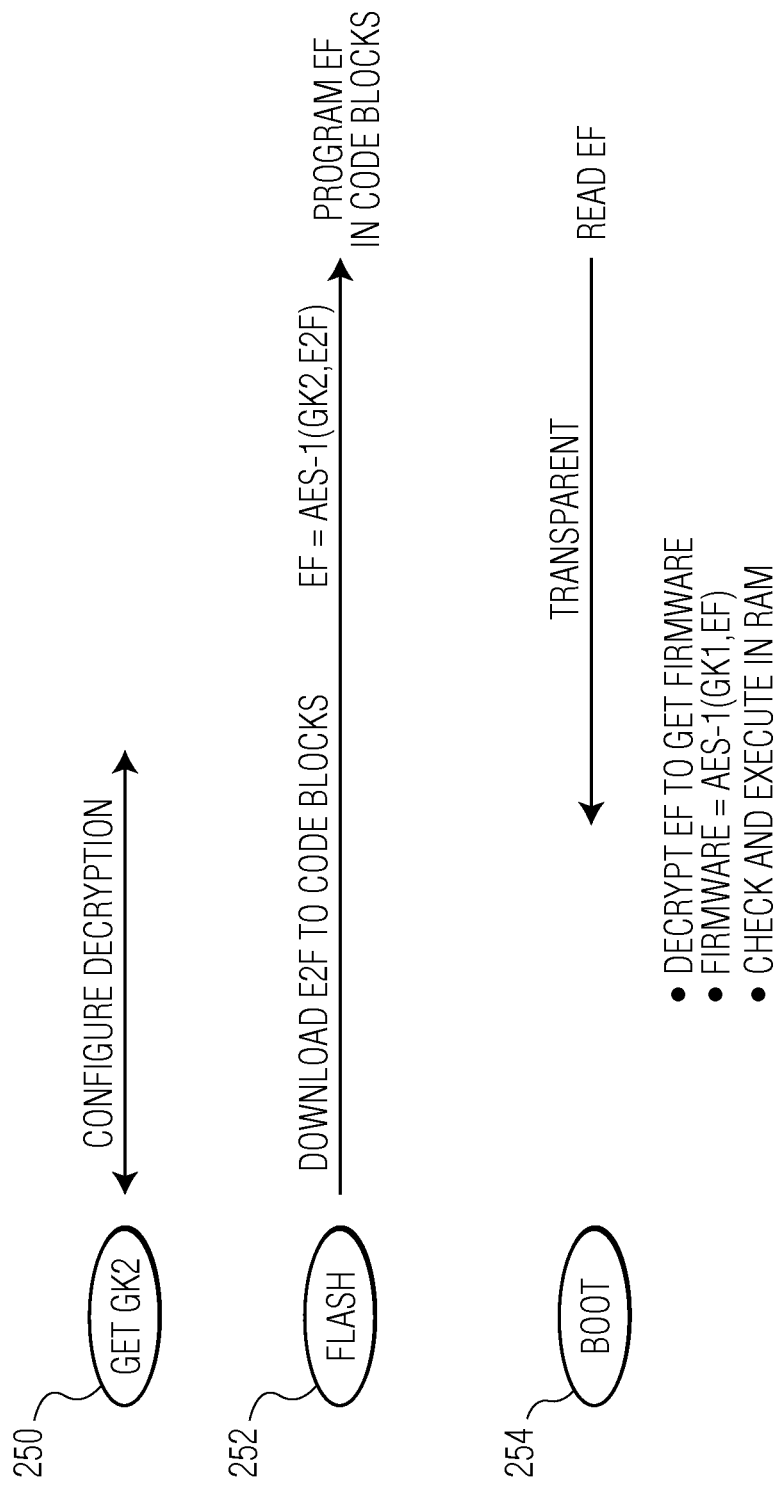
FIG. 2B illustrates a process for updating the firmware of the computing device of FIG. 2A in accordance with the invention.

FIG. 2B illustrates a process for updating the firmware of the computing device 202 of FIG. 2A in accordance with the invention. In a first operation 250, referred to as "Get GK2", the secure element 230 of the computing device communicates with the service provider server 206 to configure the decryption operation. In an embodiment, the Get GK2 operation is a software service that is added to a Device Firmware Upgrade (DFU) module in a Bootrom of the computing device. For example, the Bootrom is the ROM and associated program code and data of the host processor, which is unalterable. The Get GK2 service is configured to implement a mutual authentication operation between the secure element and the service provider server, to transfer the second crypto-key, GK2, to the secure element through a secure channel, and to learn the address configuration of the non-volatile memory 212, e.g., which addresses in the non-volatile memory are designated as code blocks and which addresses in the non-volatile memory are designated as data blocks. The communications of the Get GK2 operation occur within the computing device between the host processor and the secure element over the control bus 236 (e.g., I$^2$C bus). Once the secure element is configured for decryption, e.g., the secure element knows the second crypto-key, GK2, and the code block addresses of the non-volatile memory, the process moves to a "Flash" operation 252. In the Flash operation, the double-encrypted firmware image, E2F, is downloaded from the firmware source to code blocks of the computing device's non-volatile memory. Because the secure element is located in the data path 232/234 between the host processor and the secure element, the double-encrypted firmware image, E2F, must enter the secure element. When the double-encrypted firmware image, E2F, enters the secure element, the double-encrypted firmware image is identified as data that is to be written to code blocks of the non-volatile memory. For example, the double-encrypted firmware image, E2F, is identified as such because the data is addressed to a code block or code blocks within the non-volatile memory. Because the data is to be written to code blocks of the non-volatile memory, the data is decrypted by the crypto-engine 240 using the second crypto-key, GK2. Decrypting the double-encrypted firmware image, E2F, with the second crypto-key, GK2, results in the encrypted firmware image, EF. The decryption operation performed by the secure element can be expressed as:

$$EF=AES-1(GK2,E2F) \quad (3)$$

The encrypted firmware image, EF, is then transmitted to the non-volatile memory 212 and written to code blocks 242 within the non-volatile memory. On the other hand, data that is to be written to data blocks 244 of the non-volatile memory passes transparently through the secure element 230 without encryption. That is, data that is addressed to data blocks within the non-volatile memory is recognized as such by the secure element and passed through the secure element without being decrypted.

With the encrypted firmware image, EF, stored in the non-volatile memory 212 of the computing device 202, the computing device is ready to be re-booted. In a "Boot" operation 254, the encrypted firmware image, EF, is read from the non-volatile memory as is conventionally done in a Boot operation. Upon read-out, the encrypted firmware image, EF, passes transparently through the secure element 230 to the host processor 210 via the first and second segments of the serial bus and the host processor decrypts the encrypted firmware image, EF, using the first crypto-key, GK1, as is conventionally done. The decryption operation performed by the host processor can be expressed as:

$$firmware=AES-1(GK1,EF) \quad (4)$$

The decrypted firmware is then checked by the host processor 210 and executed in RAM of the computing device 202. Using the above-described architecture and processes, a firmware update and subsequent re-boot can only be successfully accomplished if both crypto-keys (GK1 and GK2) are known at the computing device. In particular, the host processor must have knowledge of the first crypto-key, GK1, and the secure element 230 must have knowledge of the second crypto-key, GK2. If the secure element is not properly configured with the second crypto-key, GK2, the secure element will generate a random key that is used to decrypt any data that is destined for code blocks 242 of the non-volatile memory. When the decrypted data is eventually read from the non-volatile memory in a device re-boot, the data will be unintelligible and undecipherable to the host processor. For example, the host processor will decrypt the read data using the first crypto-key, GK1, but the decrypted data will not be the same as the original firmware. Further, the original firmware is also signed and since the signature will not be valid, the host processor will not try to execute the decrypted program code. The decrypted data is therefore not able to re-boot the computing device.

Figure 4A:
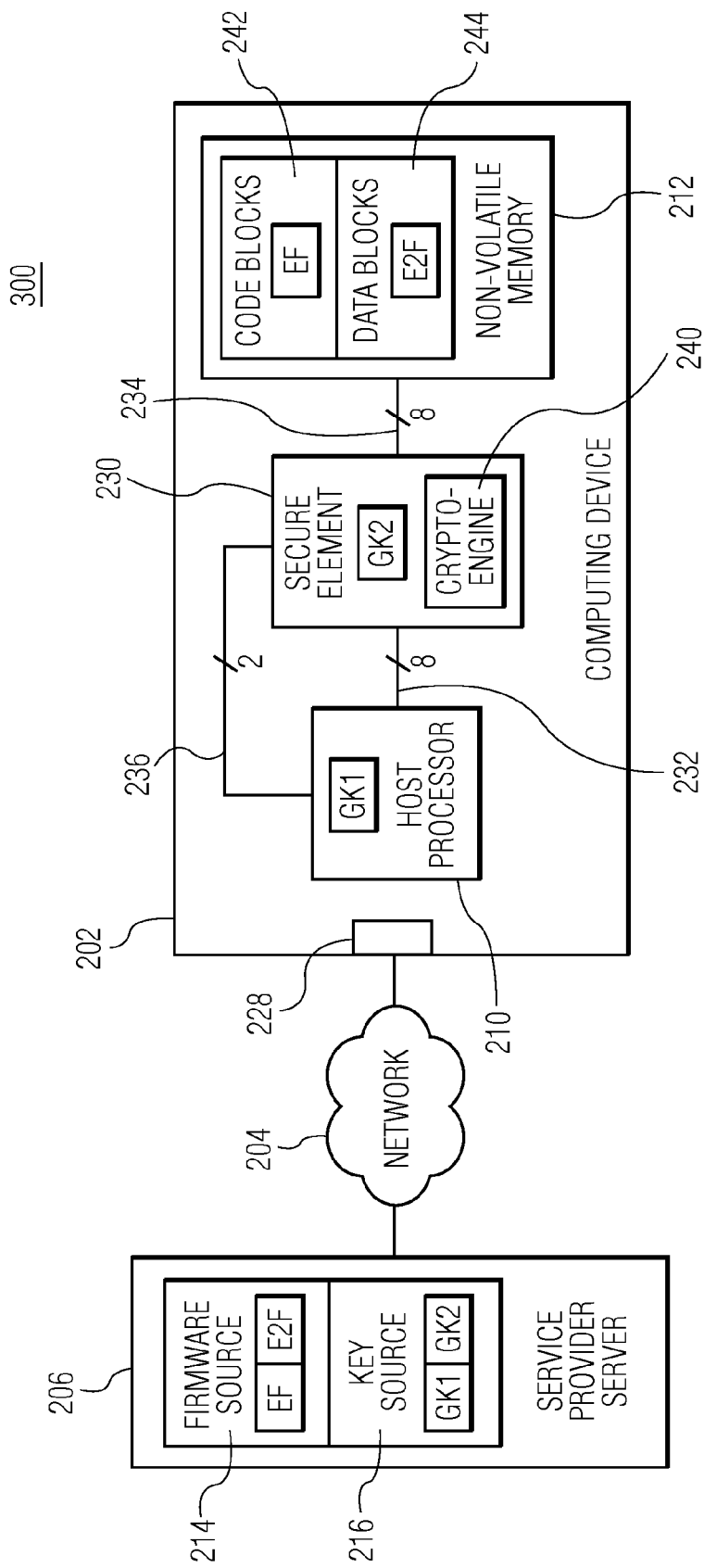
FIG. 4A depicts a network architecture for updating firmware in a computing device in accordance with the invention.
Figure 4B:
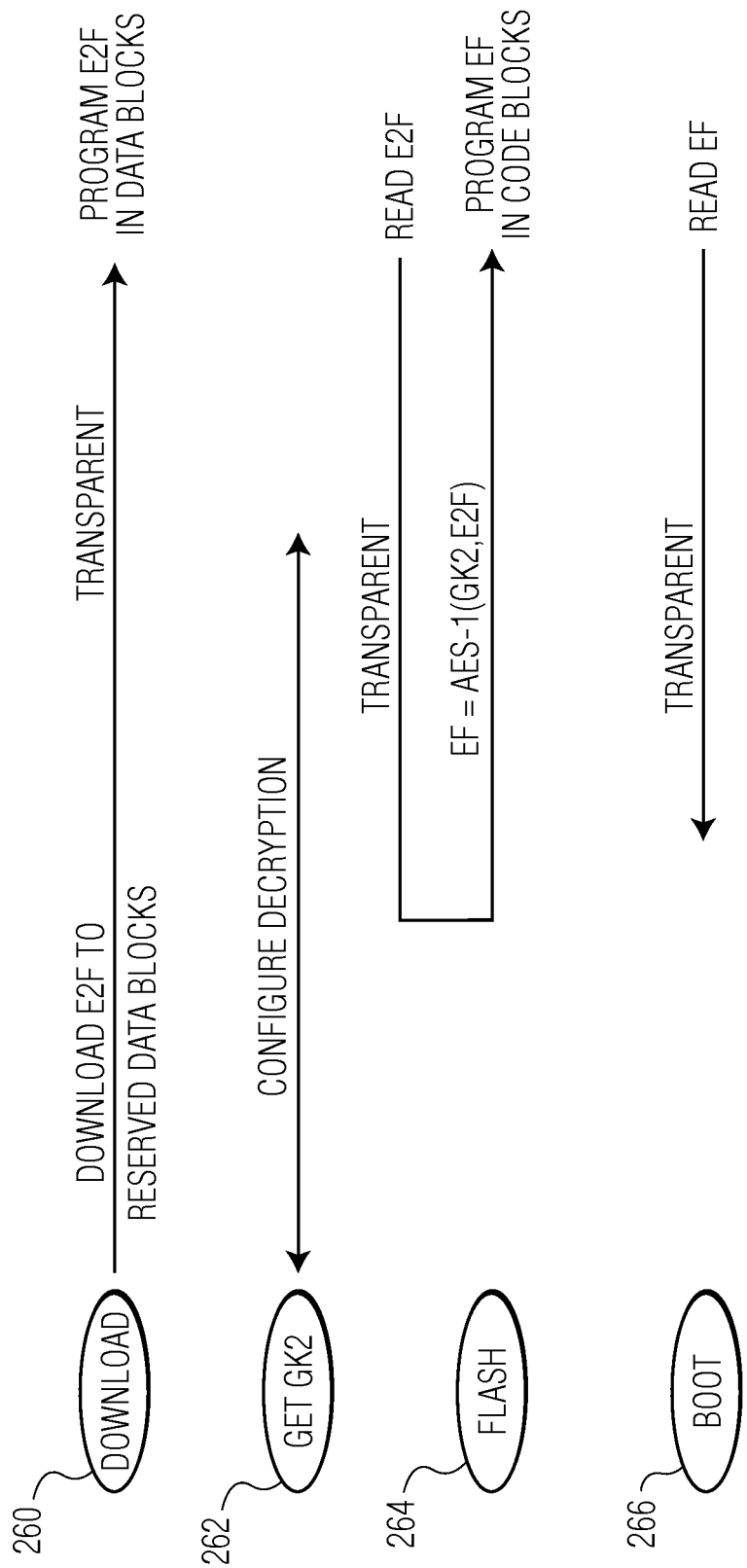
FIG. 4B illustrates a process for updating the firmware of the computing device of FIG. 4A in accordance with the invention.

In the above-described processes, the double-encrypted firmware image, E2F, is decrypted upon receipt by the secure element 230 and stored directly into the code blocks 242 of the non-volatile memory 212 of the computing device 202. FIGS. 4A and 4B are directed to an alternative embodiment to the embodiment of FIGS. 2A and 2B in which the double-encrypted firmware image is stored initially in the data blocks 244 of the non-volatile memory of the computing device in the double encrypted form and decrypted by the secure element during a subsequent operation. FIG. 4A depicts a network architecture 300 for updating firmware in the computing device 202 in accordance with the invention. For reference, the primary difference between FIG. 2A and FIG. 4A is that a copy of the double-encrypted firmware image, E2F, is initially stored in the data blocks 242 of the non-volatile memory.

FIG. 4B illustrates an alternative process for updating the firmware of the computing device 202 of FIG. 4A in accordance with the invention. In a first operation 260, "Download", the double-encrypted firmware image, E2F, is downloaded from the firmware source 214 to data blocks 244 of the non-volatile memory 212 instead of to code blocks 242 of the non-volatile memory as is the case in the embodiment of FIGS. 2A and 2B. Because the double-encrypted firmware image is intended for data blocks of the non-volatile memory instead of code blocks, the secure element 230 does not decrypt the double-encrypted firmware image as it passes through the secure element. That is, the secure element recognizes the write addresses as data block addresses and therefore, passes the data transparently. In particular, the secure element does not decrypt the double-encrypted firmware image using the second crypto-key, GK2, or using a randomly generated crypto-key in the case that the second crypto-key is not known by the secure element. Once the double-encrypted firmware image is stored in the non-volatile memory, a "Get GK2" operation 262 can begin. The "Get GK2" operation is similar to the operation 250 described above with reference to FIG. 2A and is not described further. In the embodiment of FIG. 4B, the Download operation 260 occurs before the Get GK2 operation 262, however, in another embodiment, the Get GK2 operation can occur before the Download operation. Once the Download and Get GK2 operations are complete, the process can move to a "Flash" operation 264. In the Flash operation, the double-encrypted firmware image, E2F, is read by the host processor from data blocks of the non-volatile memory. Upon being read by the host processor, the double-encrypted firmware image is redirected from the host processor to the non-volatile memory for writing to code blocks of the non-volatile memory. Because the double-encrypted firmware image is intended for writing in code blocks of the non-volatile memory (e.g., the write addresses correspond to code blocks), the secure element decrypts the data using the second crypto-key, GK2. The decryption operation performed by the secure element can be expressed as above-described equation (3).

Decrypting the double encrypted firmware image with crypto-key GK2 results in the encrypted firmware image, EF. The encrypted firmware image, EF, is then transmitted to the non-volatile memory 212 and written to code blocks 242 within the non-volatile memory. With the encrypted firmware image, EF, stored in the non-volatile memory 212 of the computing device 202, the computing device is ready to be re-booted as described above with reference to FIG. 2B. In particular, a "Boot" operation 266 of FIG. 4A is essentially the same as the Boot operation 254 described with reference to FIG. 2B. Therefore, the Boot 266 operation of FIG. 4B is not described in more detail.

Figure 5:
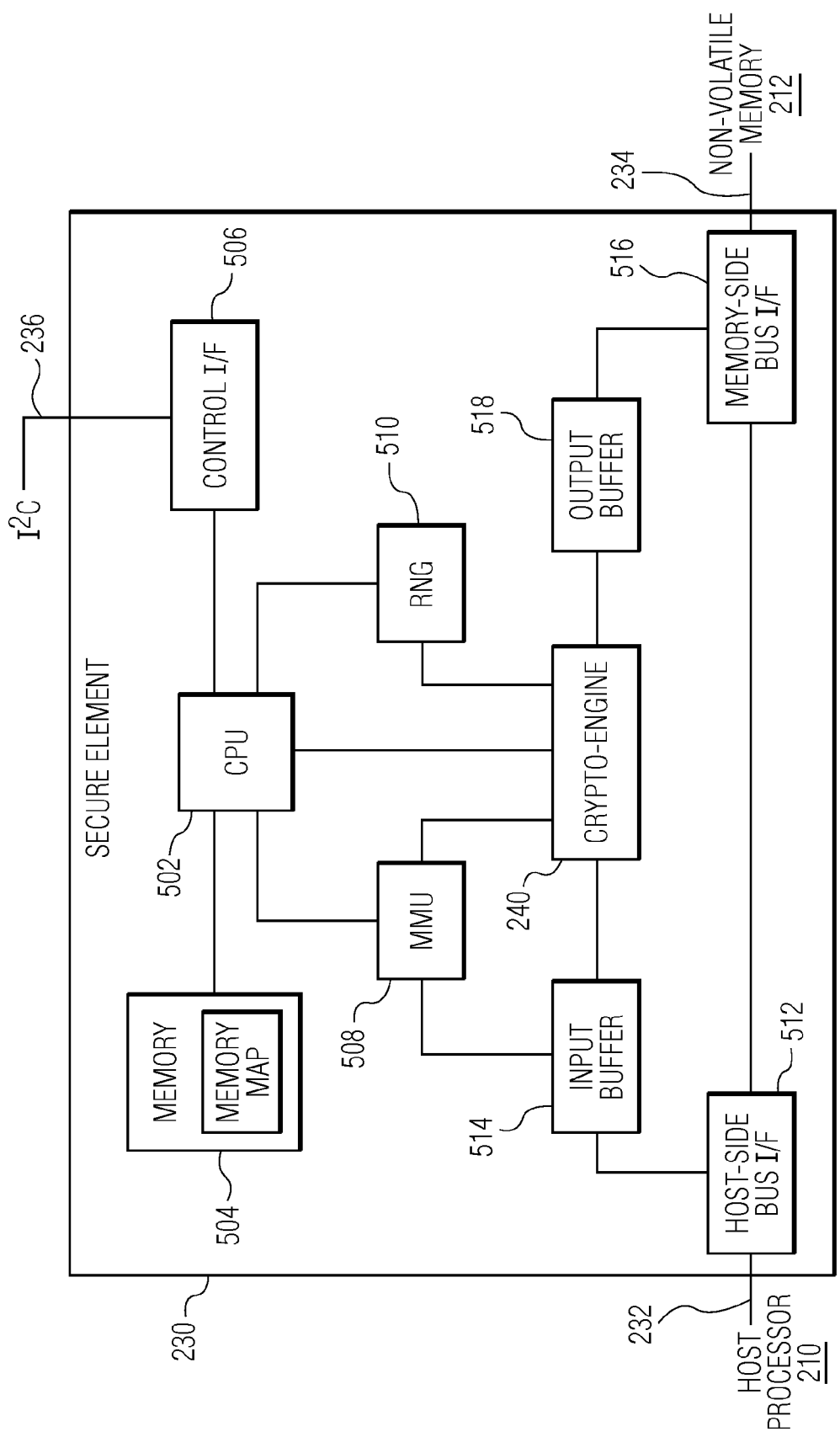
FIG. 5 depicts an expanded view of an embodiment of the secure element of FIGS. 2A and 4A.

As described above with regard to FIGS. 2A-4B, the secure element 230 is configured to determine whether data is intended for writing to code blocks 242 or to data blocks 244 of the non-volatile memory 212 and to decrypt data intended for code blocks using the second crypto-key, GK2. FIG. 5 depicts an expanded view of an embodiment of the secure element 230 of FIGS. 2A and 4A.

In the embodiment of FIG. 5, the secure element 230 includes a CPU 502, a memory 504, a control interface 506, a memory management unit (MMU) 508, a random number generator (RNG) 510, the crypto-engine 240, a host-side bus interface 512, an input buffer 514, a memory-side bus interface 516, and an output buffer 518. In the embodiment of FIG. 5, the CPU provides microinstruction and data processing capability for the computing device 202 and the memory may include on-chip volatile memory, e.g., RAM and non-volatile memory, e.g., ROM, PROM, EEPROM, flash. The control interface is compatible with the control bus 236 and the host-side and memory-side interfaces are compatible with the bus 232/234, e.g., an 8-bit serial bus. The crypto-engine is configured to perform decryption, e.g., AES, using a crypto-key, (e.g., GK2), as described above. The memory is configured with a layout map of the non-volatile memory, for example, a memory map of the code and data block addresses of the non-volatile memory and the memory management unit includes an address decoder configured to identify the write addresses of incoming data and to determine the appropriate blocks for data that is intended to be written to the non-volatile memory. In an embodiment, the layout map is stored in persistent memory of the secure element, such that the layout map is not lost at power down or reset.

If the secure element 230 does not have knowledge of the second crypto-key, GK2, e.g., the second crypto-key has not been communicated to the secure element, the secure element will still decrypt all data that is to be written to code blocks 242 of the non-volatile memory 212 using a random key. In an embodiment, if the memory management unit 508 identifies data that is to be written to code blocks of the non-volatile memory and if the secure element does not have the second crypto-key, GK2, the secure element will generate its own random crypto-key using a value from the random number generator 510. Any data that is written to code blocks of the non-volatile memory after being decoded with the random crypto-key will be undecipherable to the host processor upon re-boot. Therefore, if an unauthorized encrypted image of a firmware object is stored in the non-volatile memory in an attempt to enable an untethered jailbreak, the firmware object will be undecipherable upon being read by the host processor during re-boot. In an embodiment, the crypto-engine is initialized with a random crypto-key upon boot up. Additionally, crypto-keys are not stored in persistent memory of the secure element, such that the crypto-keys are lost at power down or reset.

In an embodiment, the secure element 230 is embodied as a standalone integrated circuit (IC) that is fixed in the data path 232/234 between the host processor 210 and the non-volatile memory 212. For example, the standalone IC has pins for the host-side bus interface 512, pins for the memory-side bus interface 516, and pins for the control interface 506. In another embodiment, the secure element can be integrated on the same IC as the non-volatile memory, e.g., a flash IC. In other embodiments, the secure element can be integrated entirely or partially into the host processor IC.

Figure 6:
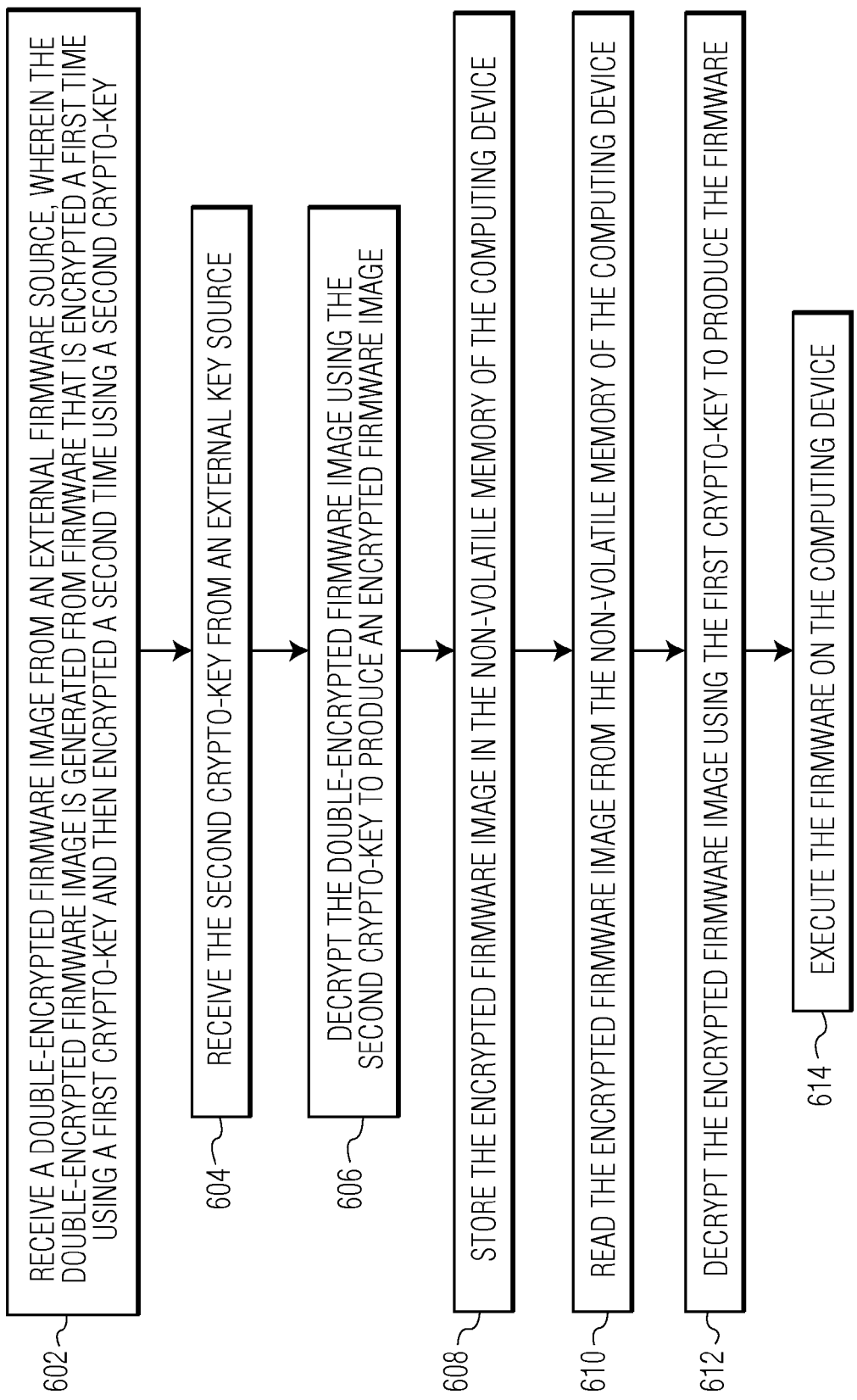
FIG. 6 is a process flow diagram of a process for updating the firmware of a computing device in accordance with the invention.

FIG. 6 is a process flow diagram of a process for updating firmware in a computing device in accordance with the invention. At block 602, a double-encrypted firmware image is received from an external firmware source, wherein the double-encrypted firmware image is generated from firmware that is encrypted a first time using a first crypto-key and then encrypted a second time using a second crypto-key. At block 604, the second crypto-key is received from an external key source. At block 606, the double-encrypted firmware image is decrypted using the second crypto-key to produce an encrypted firmware image. At block 608, the encrypted firmware image is stored in the non-volatile memory of the computing device. At block 610, the encrypted firmware image is read from the non-volatile memory of the computing device. At block 612, the encrypted firmware image is decrypted using the first crypto-key to produce the firmware. In an embodiment, the computing device verifies a firmware signature using, for example, a public key infrastructure (PKI) certificate. In an embodiment, before decrypting the encrypted firmware image, the secure element verifies a firmware image signature using GK1. At block 614, the firmware is executed on the computing device.

In an embodiment, encryption involves applying an AES algorithm to data while decryption involves applying an inverse of the AES algorithm to the data. In another embodiment, encryption involves applying an inverse of an AES algorithm to data while decryption involves applying the AES algorithm to the data. Applying this logic to the techniques of FIGS. 2A-4B, the secure element performs the inverse of the operation performed by the service provider server or vice versa. In an embodiment, the secure element is configured to implement the fastest of the encryption or decryption operations. In an embodiment, the secure element is configured to implement a relatively lightweight cryptographic algorithm, e.g., with MIN-AES, which has a latency on the order of 10 times lower than AES.

The above-described technique for securely updating firmware in a computing device requires the secure element 230 to be in place in the data path 232/234 between the host processor 210 and the non-volatile memory 212. In order to successfully jailbreak such a computing device, a malicious actor may try to bypass or remove the secure element from the computing device. Techniques for confirming the presence of the secure element are described below with reference to FIGS. 7A-8B.

Figure 7A:
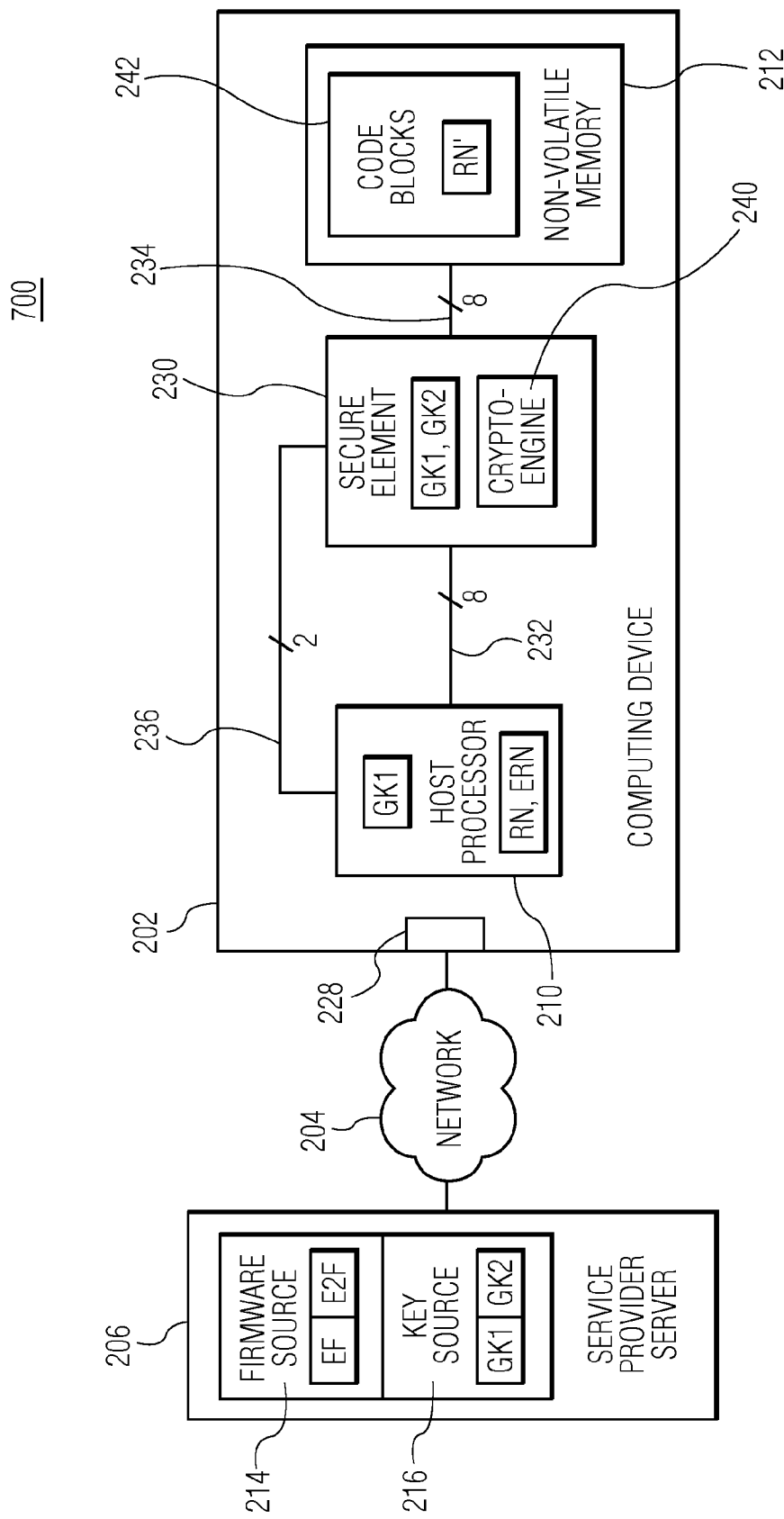
FIG. 7A depicts a network architecture for confirming the presence of the secure element in a computing device in accordance with the invention.

FIG. 7A depicts a network architecture 700 for confirming the presence of the secure element 230 in the computing device 202 in accordance with the invention. The network architecture is similar to the architectures 200 and 300 described above with reference to FIGS. 2A, 4A, and 5.

Figure 7B:
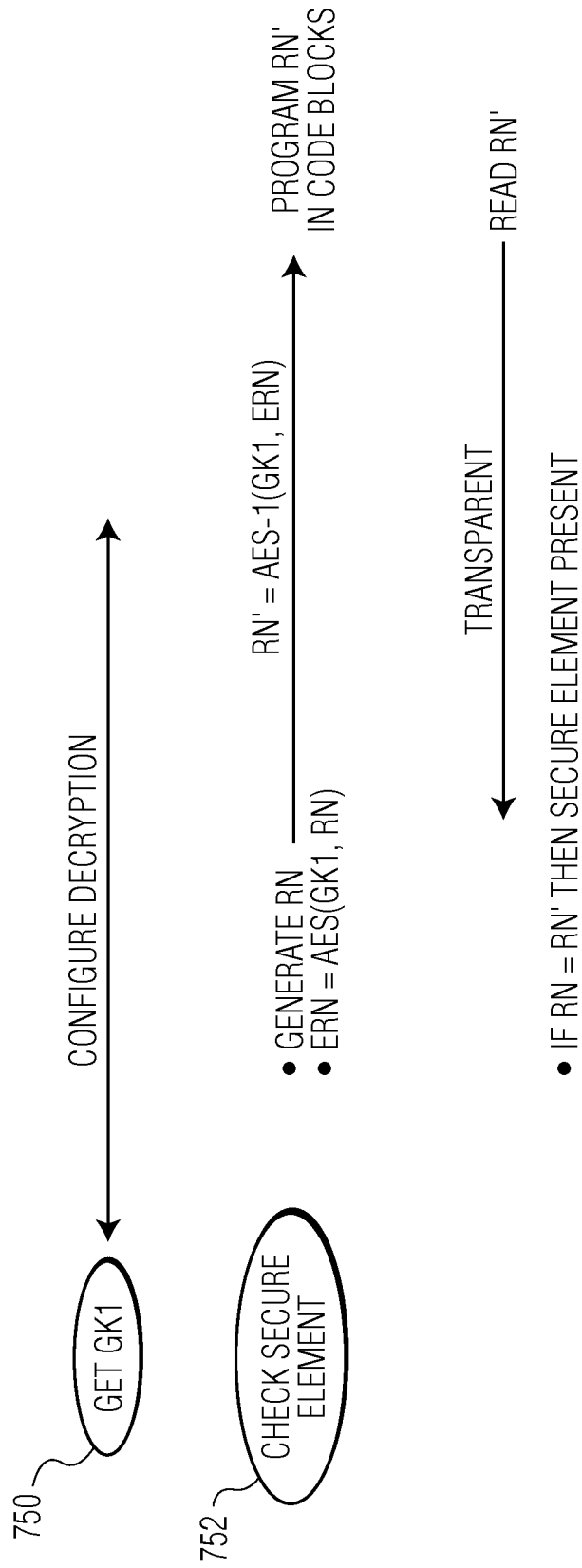
FIG. 7B illustrates a process for confirming the presence of the secure element in the computing device of FIG. 7A in accordance with the invention.

FIG. 7B illustrates a process for confirming the presence of the secure element 230 in the computing device 202 of FIG. 7A in accordance with the invention. In a first operation 750, referred to as "Get GK1", the secure element of the computing device communicates with the service provider server 206 to configure a decryption operation. In an embodiment, the Get GK1 operation is a software service that is added to a Device Firmware Upgrade (DFU) module in a Bootrom of the computing device. The Get GK1 service is configured to implement a mutual authentication operation between the secure element and the service provider server, to transfer the first crypto-key, GK1, to the secure element through a secure channel, and to learn the address configuration of the non-volatile memory, e.g., which addresses in the non-volatile memory are designated as code blocks and which addresses in the non-volatile memory are designated as data blocks. The communications of the Get GK1 operation occur within the computing device between the host processor and the secure element over the control bus (e.g., $I^2C$ bus). Once the secure element is configured for decryption, e.g., the secure element knows the first crypto-key, GK1, and the code block addresses of the non-volatile memory, the process moves to a "Check Secure Element" operation 752. In the Check Secure Element operation, a random number, RN, or "Nonce" is generated by the host processor and encrypted by the host processor using AES and the first crypto-key, GK1. The encrypted random number can be expressed as:

$$ERN=AES(GK1,RN) \tag{5}$$

The encrypted random number, ERN, is then written to code blocks 242 of the non-volatile memory 212. Because the secure element is located in the data path 232/234 between the host processor 210 and the secure element 230, the encrypted random number, ERN, must enter the secure element. When the encrypted random number, ERN, enters the secure element, the encrypted random number is identified as data that is to be written to code blocks of the non-volatile memory. For example, the encrypted random number, ERN, is identified as such because the data is addressed to a code block or code blocks within the non-volatile memory. Because the data is to be written to code blocks of the non-volatile memory, the data is decrypted by the crypto-engine using the first crypto-key, GK1. Decrypting the encrypted random number, ERN, with the first crypto-key, GK1, results in the decrypted random number, RN'. The decryption operation performed by the secure element can be expressed as:

$$RN'=AES-1(GK1,ERN) \tag{6}$$

The decrypted random number, RN', is then transmitted to the non-volatile memory and written to code blocks within the non-volatile memory. Next, the host processor reads the decrypted random number, RN', from the non-volatile memory and compares the random number, RN, to the decrypted random number, RN'. If the random number is equal to the decrypted random number, RN=RN', then it is confirmed that the secure element is present and operational. On the other hand, if the random number is not equal to the decrypted random number, RN≠RN', then it is confirmed that the secure element is not present and operational.

Figure 8A:
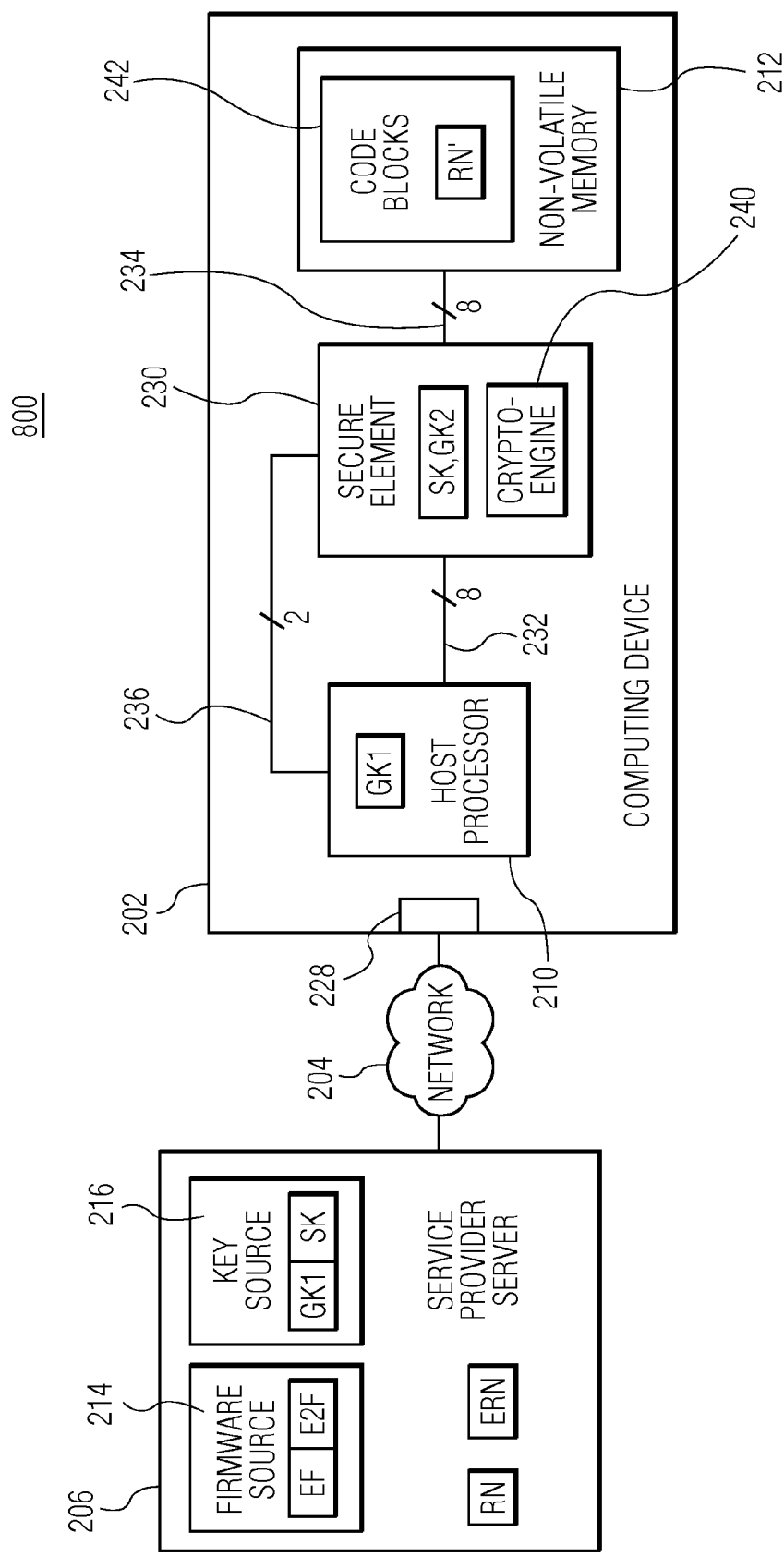
FIG. 8A depicts a network architecture for confirming the presence of the secure element in a computing device in accordance with the invention.

The technique described with reference to FIGS. 7A and 7B utilizes the first crypto-key, GK1 to encrypt/decrypt a random number, RN, which is generated and confirmed at the host processor 210. In an alternative embodiment, the random number is generated and confirmed at the service provider server 206 using an alternative key, such as a session-based key, e.g., a session key, SK. FIG. 8 depicts a network architecture 800 for confirming the presence of the secure element 230 in the computing device 202 in accordance with the invention. In the embodiment of FIG. 8A, a session crypto-key SK is provided by the key source.

Figure 8B:
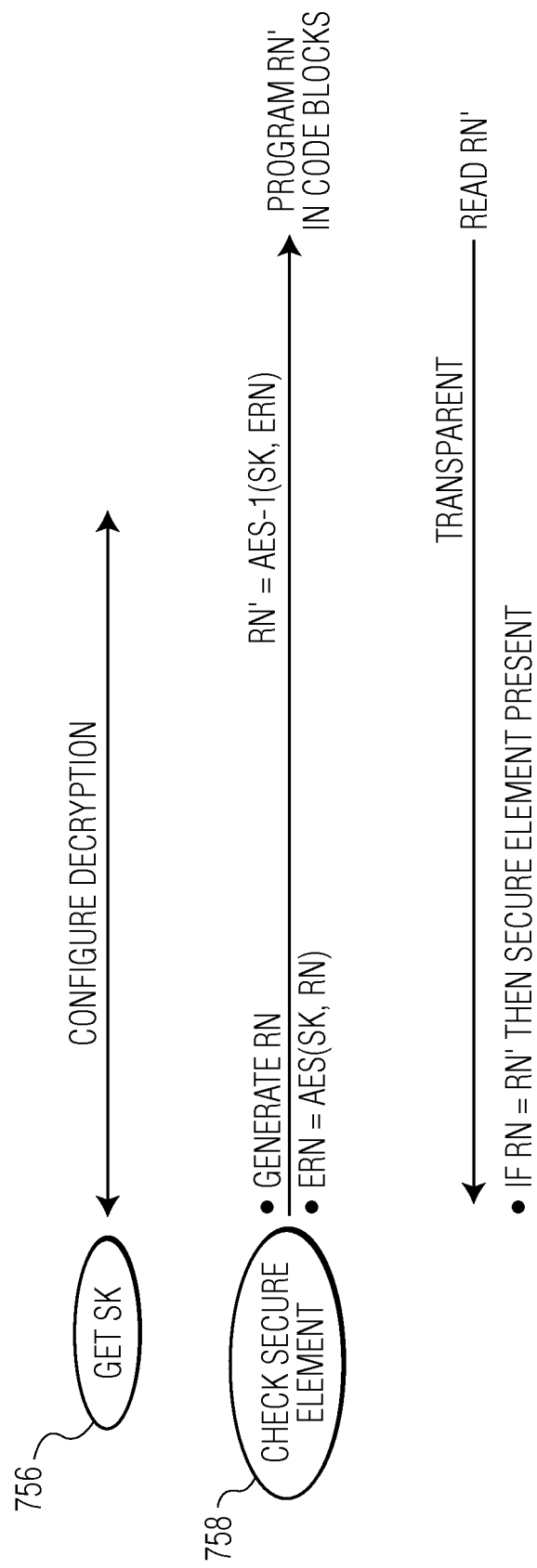
FIG. 8B illustrates a process for confirming the presence of the secure element in the computing device of FIG. 8A in accordance with the invention.

FIG. 8B illustrates another process for confirming the presence of the secure element 230 in the computing device 202 of FIG. 8A in accordance with the invention. In a first operation 756, referred to as "Get SK", the secure element of the computing device communicates with the service provider server to configure a decryption operation. In an embodiment, the Get SK operation is a software service that is added to the DFU module in a Bootrom of the computing device. The Get SK service is configured to implement a mutual authentication operation between the secure element and the service provider server, to transfer the session crypto-key, SK, to the secure element through a secure channel, and to learn the address configuration of the non-volatile memory, e.g., which addresses in the non-volatile memory are designated as code blocks and which addresses in the non-volatile memory are designated as data blocks. The communications of the Get SK operation occur within the computing device between the host processor and the secure element over the control bus (e.g., $I^2C$ bus). Once the secure element is configured for decryption, e.g., the secure element knows the session crypto-key, SK, and the code block addresses of the non-volatile memory, the process moves to a "Check Secure Element" operation 758. In the Check Secure Element operation, a random number, RN, or "Nonce" is generated by the service provider server and encrypted by the service provider server using AES and the session crypto-key, SK. The encrypted random number can be expressed as:

$$ERN=AES(SK,RN) \tag{7}$$

The encrypted random number, ERN, is then written to code blocks 242 of the non-volatile memory 212. Because the secure element 230 is located in the data path 232/234 between the host processor 210 and the secure element, the encrypted random number, ERN, must enter the secure element. When the encrypted random number, ERN, enters the secure element, the encrypted random number is identified as data that is to be written to code blocks of the non-volatile memory and decrypted by the crypto-engine using the session crypto-key, SK. Decrypting the encrypted random number, ERN, with the session crypto-key, SK, results in the decrypted random number, RN'. The decryption operation performed by the secure element can be expressed as:

$$RN'=AES-1(SK,ERN) \tag{8}$$

The decrypted random number, RN', is then transmitted to the non-volatile memory and written to code blocks within the non-volatile memory. Next, the service provider server requests the decrypted random number, RN', from the computing device. The service provider receives the decrypted random number and compares the random number, RN, to the decrypted random number, RN'. If the random number is equal to the decrypted random number, RN=RN', then it is confirmed that the secure element is present and operational. On the other hand, if the random number is not equal to the decrypted random number, RN≠RN', then it is confirmed that the secure element is not present and operational.

FIG. 9 is a process flow diagram of a process for confirming the presence of a secure element in a computing device in accordance with the invention. At block 902, an encrypted random number is received at the secure element, wherein the random number is encrypted using a crypto-key. At block 904, the crypto-key is received from an external key source. At block 906, the encrypted random number is decrypted at the secure element using the crypto-key to produce a decrypted random number. At block 908, the decrypted random number is stored in the non-volatile memory of the computing device. At block 910, the decrypted random number is read from the non-volatile memory of the computing device. At block 912, the decrypted random number is compared to a stored version of the random number. At block 914, the presence of the element is confirmed if the decrypted random number matches the stored random number.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for updating firmware in a computing device, the computing device including a host processor and a non-volatile memory, the method comprising:
 receiving a double-encrypted firmware image from an external firmware source, wherein the double-encrypted firmware image is generated from firmware that is encrypted a first time using a first crypto-key and then encrypted a second time using a second crypto-key;
 receiving the second crypto-key from an external key source;
 decrypting the double-encrypted firmware image using the second crypto-key to produce an encrypted firmware image;
 storing the encrypted firmware image in the non-volatile memory of the computing device;
 reading the encrypted firmware image from the non-volatile memory of the computing device;
 decrypting the encrypted firmware image using the first crypto-key to produce the firmware; and
 executing the firmware on the computing device;
 wherein the second crypto-key is received and stored at a secure element located between the host processor and the non-volatile memory; and
 wherein the secure element is configured to apply decryption to data addressed to code blocks in the non-volatile memory and to pass without decryption data addressed to data blocks in the non-volatile memory.

2. The method of claim 1 wherein the double-encrypted firmware image is decrypted by the secure element using the second crypto-key.

3. The method of claim 2 wherein the secure element includes a host-side interface connected to a host-side data bus and a memory-side interface connected to a memory-side data bus, and wherein the secure element includes a crypto-engine configured to decrypt the double-encrypted firmware.

4. The method of claim 1 wherein the double-encrypted firmware image is decrypted using the second crypto-key upon receipt of the double-encrypted firmware image from the external firmware source without first being stored in the non-volatile memory.

5. The method of claim 1 wherein the double-encrypted firmware image is first stored in the non-volatile memory and then read from the non-volatile memory and decrypted using the second crypto-key.

6. The method of claim 1 wherein the first crypto-key is a group key (GK1), which is the same for a group of computing devices, and wherein the second crypto-key is a group key (GK2), which is the same for a particular version of the firmware.

7. The method of claim 1 wherein the second crypto-key is received from the external key source via a secure channel.

8. The method of claim 1 further comprising decrypting an encrypted random number at the secure element to confirm the presence of the secure element.

9. A computing device comprising:
 a data interface configured to receive a double-encrypted firmware image from an external firmware source, wherein the double-encrypted firmware image is generated from firmware that is encrypted a first time using a first crypto-key and then encrypted a second time using a second crypto-key, and to receive the second crypto-key from an external key source;
 a host processor configured to execute program code of the firmware;
 a non-volatile memory configured to store an encrypted image of the firmware; and
 a secure element located in a data path between the host processor and the non-volatile memory and having a crypto-engine, the crypto-engine being configured to decrypt the double-encrypted firmware image using the second crypto-key to produce an encrypted firmware image and the secure element being configured to provide the encrypted firmware image to the non-volatile memory of the computing device for storage;

the host processor being configured to read the encrypted firmware image from the non-volatile memory, to decrypt the encrypted firmware image using the first crypto-key to produce the firmware, and to execute program code of the firmware on the computing device;

wherein the secure element is configured to apply decryption to data addressed to code blocks in the non-volatile memory and to pass without decryption data addressed to data blocks in the non-volatile memory.

10. The computing system of claim 9 wherein the double-encrypted firmware image is decrypted at the secure element using the second crypto-key upon receipt of the double-encrypted firmware image from the external firmware source without first being stored in the non-volatile memory.

11. The computing system of claim 9 wherein the double-encrypted firmware image is first passed through the secure element and stored in the non-volatile memory without being decrypted and then read from the non-volatile memory upon boot up and decrypted at the secure element using the second crypto-key.

12. The computing system of claim 9 wherein the first crypto-key is a device group key (GK1), which is the same for a group of computing devices, and wherein the second crypto-key is a group key (GK2), which is the same for a particular version of the firmware.

13. A method for confirming the presence of a secure element in a computing device, the computing device including a host processor and a non-volatile memory, the method comprising:

receiving an encrypted random number at the secure element, wherein the random number is encrypted using a crypto-key;

receiving the crypto-key from an external key source;

decrypting the encrypted random number at the secure element using the crypto-key to produce a decrypted random number;

storing the decrypted random number in the non-volatile memory of the computing device;

reading the decrypted random number from the non-volatile memory of the computing device;

comparing the decrypted random number to a stored version of the random number; and confirming the presence of the element if the decrypted random number matches the stored random number.

14. The method of claim 13 wherein the crypto-key is received and stored at a secure element, and wherein the secure element is located between the host processor and the non-volatile memory.

15. The method of claim 14 wherein the secure element is configured to apply decryption to data addressed to code blocks in the non-volatile memory and to pass without decryption data addressed to data blocks in the non-volatile memory.

16. The method of claim 13 wherein the crypto-key is a group key (GK), which is the same for a group of computing devices.

17. The method of claim 13 wherein the crypto-key is a session key (SK), which is specific to a communications session of the computing device.

* * * * *